United States Patent [19]

Todani et al.

[11] 3,940,548

[45] Feb. 24, 1976

[54] SURFACE TREATMENT OF RUBBER ARTICLES WITH AN ALKYL HYPOHALITE

[75] Inventors: Yoshihiro Todani, Kamakura; Toshio Ohkawa, Yokohama, both of Japan

[73] Assignee: Nippon Zlin Co. Ltd., Tokyo, Japan

[22] Filed: Feb. 26, 1974

[21] Appl. No.: 445,894

Related U.S. Application Data

[63] Continuation-in-part of Ser. No. 290,409, Sept. 19, 1972, abandoned.

[52] U.S. Cl. ............... 428/492; 427/444; 428/500; 427/400; 427/430
[51] Int. Cl.² .................... B32B 25/04; B32B 25/12
[58] Field of Search . 117/47 A, 138.8 UA, 138.8 B, 117/139; 427/430, 400, 322, 444; 428/492, 500

[56] References Cited
UNITED STATES PATENTS

| | | | |
|---|---|---|---|
| 1,491,265 | 4/1924 | Hopkinson | 117/139 |
| 2,102,456 | 12/1937 | Brill et al. | 117/139 |
| 2,878,519 | 3/1959 | Wolinski | 18/48 |
| 2,929,825 | 3/1960 | Stephens | 117/139 |
| 3,080,252 | 3/1963 | Freier et al. | 117/139 |
| 3,080,255 | 3/1963 | Winkelmann | 117/47 |
| 3,352,818 | 11/1967 | Meyer et al. | 260/45.7 |

*Primary Examiner*—Harry J. Gwinnell
*Assistant Examiner*—Sadie L. Childs
*Attorney, Agent, or Firm*—Sherman & Shalloway

[57] ABSTRACT

A process for treating the surfaces of shaped articles of rubber, which comprises contacting the surfaces of shaped articles of rubber containing carbon-to-carbon unsaturated double bonds, with an alkyl hypohalite.

14 Claims, No Drawings

SURFACE TREATMENT OF RUBBER ARTICLES WITH AN ALKYL HYPOHALITE

This application is a continuation-in-part application of U.S. Ser. No. 290,409 filed Sept. 19, 1972, now abandoned.

This invention relates to a process for treating surfaces of shaped rubber articles. More particularly, the invention relates to a process comprising contacting the surface of shaped articles of rubber containing carbon-to-carbon unsaturated double bonds, with an alkyl hypohalite, thereby producing rubber articles having low friction factor, improved ozone resistance, hydrocarbon impermeability, and adhesion.

Frequently attempts have been made to reduce the friction factor of shaped rubber articles, for the purpose of improving the workability of unvulcanized rubber before and during vulcanization, the workability of vulcanized rubber for handling and packing, as well as the workability and durability of rubber products under use. As such means, it is known to contact the surfaces of shaped rubber articles with an inorganic acid or halogen. Known methods of this type are admittedly effective for reducing the friction factor, but are defective in that the so treated vulcanized rubber products easily develop cracks when exposed to ozone-containing atmospheres.

Hydrocarbons, for example those exhausted from the fuel systems of traffic conveyances are one of the great causes of air pollution. Hydrocarbons exhausted through the wall of a rubber tube of the fuel system account for a substantial amount of those hydrocarbons exhausted from such fuel systems. A method of preventing or controlling the permeation of hydrocarbons through such a rubber tube has not yet been found. Such a method has been greatly desired socially from the viewpoint of controlling air pollution.

In the field of bonding, a bonding agent which adhers firmly to rubber has scarcely been available in the past. Thus, even though a bonding agent having a high bond strength to a bonding material such as a metal, fiber, wood, or glass is used to bond rubbers, the composite article obtained tends to be separated easily between the bonding agent and the rubbers. Accordingly, various treatments have so far been performed on the surface of the shaped rubber article used as a base material. For instance, there can be enumerated a method (1) wherein any sulfur, accelerator, wax, process oil, and/or plasticizer bloomed on the surface of the base material and preventing adhesion are removed, and the surface of the base material is roughened by mechanical abrading; a method (2) wherein the surface of the base material is immersed in concentrated sulfuric acid for 2 to 10 minutes, washed first with cold water and then with hot water, and dried; and a method (3) wherein the surface of the base material is treated with a solution consisting mainly of a mixture of an organic monocarboxylic acid and phosphoric acid. However, the abrading method (1) tends to cause non-uniform bonding strength by uneven abrading, and process control is difficult. Additionally the abrading needs much time and considerable labor to reduce processability, and rubber powders generated in abrading pose a sanitary problem. The method (2) of treating with concentrated sulfuric acid is complicated takes much time, and does not bring forth sufficient bonding strength. In methods (2) and (3) a polar group is introduced in the surface of the base material to adhere the surface thereof to the bonding agent physically and improve the bonding strength. But even by these methods it is difficult to improve the adhesion between the rubber and bonding agent.

Accordingly, an object of this invention is to provide shaped articles of rubber which have a low friction factor and improved resistance to ozone.

Another object of this invention is to provide a method of restraining permeation of hydrocarbons through a shaped article of rubber such as a rubber tube or rubber sheet, wherein the "hydrocarbon" to be used herein means a hydrocarbon which is liquid at room temperature and evaporated at room temperature and may be halogenated, for example, gasoline or freon.

Still another object of this invention is to provide a method of bonding shaped articles of rubber to each other or a shaped article of rubber to another substance very firmly.

These objects of the invention are achieved by contacting the surfaces of shaped articles of rubber containing carbon-to-carbon unsaturated double bonds, with an alkyl hypohalite.

The rubber articles to be treated in accordance with the invention may be defined as the shaped articles of rubber containing carbon-to-carbon unsaturated double bonds in their molecules, such as natural rubber, polyisoprene, polybutadiene, butadiene-isoprene copolymer, styrene-butadiene copolymer, acrylonitrile-butadiene copolymer, acrylonitrile-butadieneisoprene ternary copolymer, ethylene-propylene-diene ternary copolymer, polychloroprene, epichlorohydrin-unsaturated epoxide copolymer, and isobutylene-isoprene copolymer rubbers, optionally blended with other rubbers and/or conventional additives, as well as the shaped articles obtained by vulcanizing such blends. Additionally, a reinforcing agent, filler, softener, plasticizer, anti-oxidant, and other known additives to facilitate processing, can be used, when suitably selected according to the intended utility of the rubber articles.

As the alkyl hypohalite to be used for the surface treatment of such shaped rubber articles, tertiary alkyl hypohalites, such as tertiary butyl hypohalite, tertiary amyl hypohalite, are more preferable to normal or secondary alkyl hypohalites, because of their higher stability. The most preferred are tertiary butyl hypochlorite and tertiary butyl hypobromite. Halogen-substituted alkyl hypohalites, for example, di- or tri-chloromethyl hypochlorite, di- or tri-fluoromethyl hypochlorite, can also be used. According to the invention, those alkyl hypohalites may be used as they are, or as solutions in organic solvents, for the surface treatment of shaped rubber articles. It should be noted, however, that the organic solvent must be such that it may swell, but never dissolve, the rubber surfaces. Suitable solvents include aliphatic hydrocarbons such as heptane, n-hexane, and cyclohexane; aromatic hydrocarbons such as benzene, nitrobenzene, halogenated benzene, toluene and xylene; ethers such as diethylether and dioxane; esters such as ethyl acetate; ketones such as methyl ethyl ketone and cyclohexanone; chlorinated hydrocarbons such as ethyl chloride, chloroform, and carbon tetrachloride; tertiary alcohols such as tertiary butyl alcohol; and carbon disulfide. Those solvents may be used as mixtures. When an alkyl hypohalite is used in the form of a solution dissolved in these solvents, the concentration of the alkyl hypohalite in the solution is not limited particularly but selected suitably according to the properties to be imparted to the shaped articles of rubber. Generally, it is preferable that the concentration be at least 0.5% by weight.

The invention can be practiced either by immersing the rubber articles in alkyl hypohalite, or by coating or spraying alkyl hypohalite onto the rubber articles. In the former embodiment, the immersion time varies depending on such factors as the type of rubber, concentration of the alkyl hypohalite solution, type of solvent, and the intended utility of the rubber articles, normally ranging from 1 second to 10 hours, preferably from 3 seconds to 60 minutes. The temperature at which the alkyl hypohalite is contacted with the surfaces of shaped articles of rubber is from 0°C to the boiling point of alkyl hypohalite, preferably from 0°C to 30°C.

It is thus possible according to this invention to reduce the friction factor, and improve ozone resistance, hydrocarbon impermeability, and the adhesion of shaped articles of specified rubbers. However, the mechanism by which such favorable results are achieved is not yet fully clear. Presumably, however, the effect is brought about through the reaction of carbon-to-carbon unsaturated double bonds on the rubber surfaces with the alkyl hypohalite, thereby introducing halogen and alkoxy groups into the former. In the known process of directly reacting a halogen gas with shaped articles of rubber, the friction factor of the rubber is reduced probably due to addition of the halogen to the double bonds. Whereas, since according to the invention alkoxy groups are also introduced besides halogen, the surface hardness of treated articles changes only slightly. Furthermore, because the reaction reaches relatively great depths into the surface layer, concurrently with the reduction in the friction factor, an improvement in ozone resistance is also achieved. As the halogen and alkoxy groups are introduced in the treated surface, the affinity of the shaped article of rubber with hydrocarbons becomes poor, and the diffusion permeability of hydrocarbons to the shaped article of rubber is reduced. As a result, the hydrocarbon impermeability of the shaped article of rubber is improved. As the halogen introduced in the treated surface reacts with the bonding agent, the bonding strength is improved. The shaped articles of rubber treated in accordance with this invention have the wide utilities known for rubber in general. As only some of the recommended utilities, parts of industrial equipments such as packings, seals, gaskets, rolls, hoses, belts, bands, wipers, diaphragms, and the like may be named. The shaped articles of rubber treated according to the method of this invention can be applied to the production of a composite article by bonding the shaped articles of rubber to each other or the shaped article of rubber to another substance such as a vulcanized rubber, unvulcanized rubber, synthetic resin, metal, fiber, leather, wood, glass or concrete. An epoxy bonding agent is suitable as a bonding agent used in this case.

Hereinafter the invention will be explained more concretely with reference to working examples, in which the parts are by weight.

EXAMPLE 1

One-hundred parts of acrylonitrile-butadiene copolymer rubber (Nipol 1042 AL: product of Nippon Zeon Co.), 5 parts of zinc oxide, 0.5 part of sulfur, 1.5 parts of stearic acid, 20 parts of a silica-containing reinforcing agent (Carplex No. 1120: product of Shionogi Pharmaceutical Co. This same reinforcing agent was used also in the following examples), 10 parts of titanium oxide, 2.5 parts of tetramethylthiuram disulfide, and 2 parts of dibenzothiazyl disulfide, were milled with 8-inch open rolls, and the mixture was heated and pressed at 150°C. for 30 minutes. Thus obtained sheets were immersed in tertiary butyl alcohol solutions of tertiary butyl hypochlorite at the concentrations ranging from 1 to 100%, for 30 seconds. Thereafter the sheets were washed first with methyl alcohol and then with water, and dried at room temperature. The friction factors and ozone resistance of each sheet were determined by the following methods.

Static friction factor :

This was determined by slope method, using a metal piece of SUS 27 which was ground with emery cloth No. 600 (weight: 13.565 g, apparent contact area: 1.63 cm$^2$). [Refer to Norimune Soda: *Masatsu no Hanashi* (Friction), p. 15, Iwanami Shinsho.]

Dynamic friction factor :

The sample rubber sheet was inclined at an angle to elevation of 35°, and the above metal piece was caused to slide down on the sheet. The friction factor was calculated from the change in the sliding velocity of said metal piece (Ibid., pp. 41–42).

Ozone resistance :

The sample sheet was elongated by 20%, and left standing in an atmosphere of 35° ± 5°C. and containing ozone to the concentration of 100 PPHM, for 45 hours (static ozone resistance). Separately, the sample was repeatedly elongated by 0–20% at a rate of 60 times per minute, continuously for 45 hours in the same atmosphere (dynamic ozone resistance). Thereafter the sample's ozone resistance was graded according to the degree of crack occurrence. As the norm of grading, JIS K-6301 as below was followed.

Number of cracks: A : few; B : many; C : numerous; Size and depth of cracks;
1 : Cracks confirmable through a 10X magnifying lens, although invisible to naked eyes,
2 : Cracks recognizable with naked eyes,
3 : Deep cracks of relatively large sizes (less than 1 mm),
4 : Deep and large cracks (1 mm – less than 3 mm),
5 : Cracks larger than 3 mm, or those which are about to cause breakage of the sheet. The test results were as shown in Table 1.

Table 1

| Run No. | 1 | 2 | 3 | 4 | 5 | 6 | 7 | 8 |
|---|---|---|---|---|---|---|---|---|
| Tertiary butyl hypochlorite concentration (volume %) | 1 | 5 | 10 | 25 | 50 | 75 | 100 | (untreated) |
| Static friction factor | 1.37 | 1.33 | 1.54 | 0.63 | 0.55 | 0.49 | 0.45 | immeasurable* |

Table 1-continued

| Run No. | 1 | 2 | 3 | 4 | 5 | 6 | 7 | 8 |
|---|---|---|---|---|---|---|---|---|
| Dynamic friction factor | 0.41 | 0.43 | 0.38 | 0.38 | 0.43 | 0.42 | 0.40 | do. |
| Static ozone resistance | B-3 | B-3 | B-3 | A-3 | A-3 | A-2 | A-4 | C-4 |
| Dynamic ozone resistance | C-3 | B-3 | B-3 | A-2 | B-3 | B-4 | B-4 | C-4 |

*The friction factor is regarded as infinite (∞). In the following tables, "immeasurable" always means the same.

As clearly demonstrated in Table 1 above, the rubber sheet not treated with tertiary butyl hypochlorite has immeasurably high friction factor, and is severely cracked in the ozone-containing atmosphere. In contrast, the sheets treated according to the subject process exhibit low friction factors and excellent ozone resistance. Particularly favorable results are obtained when the tertiary butyl hypochlorite concentration is not lower than 25 volume %.

EXAMPLE 2

Example 1 was repeated as to Run No. 4, except that the immersion time was varied for each run as 10, 20, and 60 seconds. The results of measuring the friction factors and ozone resistance of the treated sheets are given in Table 2 below. In all runs, excellent results were obtained.

Table 2

| Run No. | 1 | 2 | 3 |
|---|---|---|---|
| Immersion time (sec.) | 10 | 20 | 60 |
| Static friction factor | 1.43 | 0.67 | 0.78 |
| Dynamic friction factor | 0.44 | 0.39 | 0.38 |
| Static ozone resistance | B-3 | B-4 | A-3 |
| Dynamic ozone resistance | C-3 | C-3 | C-3 |

EXAMPLE 3

Example 1 was repeated except that the tertiary butyl alcohol used as the solvent was changed for each run as specified in Table 3 below. In all the treating solutions, tertiary butyl hypochlorite concentration was 25 volume %. The test was again given also to an untreated sample and the results are given in Table 3, concurrently with the results of runs within the scope of this invention.

Table 3

| Run No. | 1 | 2 | 3 | 4 | 5 | 6 | 7 |
|---|---|---|---|---|---|---|---|
| Solvent | benzene | benzene | benzene | n-hexane | methyl ethyl ketone | benzene/tertiary butyl alcohol (=30/70) | (untreated) |
| Treating time (sec.) | 10 | 30 | 60 | 30 | 30 | 30 | — |
| Static friction factor | 0.21 | 0.21 | 0.18 | 0.51 | 0.36 | 0.40 | immeasurable |
| Static ozone resistance | B-3 | A-2 | A-1 | — | — | A-3 | B-4 |
| Dynamic ozone resistance | B-4 | B-3 | A-2 | — | — | B-3 | C-4 |

As shown in Table 3, excellent results were obtained in all runs excepting the control run. Particularly when a solvent which tends to swell rubber, such as benzene, is used, the reduction in friction factor is conspicuous, and the treated sheet also exhibits excellent ozone resistance.

EXAMPLE 4

Example 1 was repeated as to Run No. 4, except that the vulcanized acrylonitrile-butadiene copolymer rubber was replaced by various types of vulcanized rubber as indicated in Table 4 (vulcanized at 150°C. for 30 minutes), and static friction factor of the treated rubber sheets was measured. Compositions of the rubbers and the measured results are given in Table 4, in which the parts given for the compositions are by weight.

Table 4

| Run No. Composition | 1 | 2 | 3 | 4 | 5 |
|---|---|---|---|---|---|
| Natural rubber (RRS No. 1) | 100 | — | — | — | — |
| Polybutadiene rubber*1 | — | 100 | — | — | — |
| Ethylene-propylene-diene copolymer rubber*2 | — | — | 100 | — | — |
| Isobutylene-isoprene copolymer rubber*3 | — | — | — | 100 | — |
| Styrene-butadiene copolymer rubber*4 | — | — | — | — | 100 |
| Zinc oxide | 5 | 5 | 5 | 5 | 5 |
| Sulfur | 2.5 | 3 | 1 | 1.5 | 1.8 |
| Stearic acid | 2 | 1 | 1 | 2 | 1.5 |
| Silica-containing reinforcing agent | 20 | 20 | 20 | 20 | — |

Table 4-continued

| Run No.<br>Composition | 1 | 2 | 3 | 4 | 5 |
|---|---|---|---|---|---|
| Light calcium carbonate*5 | 20 | 20 | 20 | 20 | — |
| Activated calcium carbonate*6 | — | — | — | — | 30 |
| Hard clay | — | — | — | — | 30 |
| Titanium oxide | 10 | 10 | 10 | 10 | — |
| Dibenzothiazyl di-sulfide | 0.7 | 1.5 | 1.0 | 5.0 | 1.5 |
| Diphenyl guanidine | 0.3 | 0.3 | — | — | 0.7 |
| Para-quinone dioxime | — | — | — | 2.0 | — |
| Elastpar (vulcanization promotor) | — | — | — | 1 | — |
| Static friction factor Untreated | Immeasurable | Immeasurable | Immeasurable | Immeasurable | Immeasurable |
| Treated | 1.19 | 0.51 | 0.40 | 1.54 | 0.60 |

*1Nipol BR 1220: product of Nippon Zeon Co.
*2Mitsui EPT 40 45: product of Mitsui Sekiyu Kagaku K.K.
*3Enjay butyl 218: product of Esso Standard Oil Co.
*4Nipol 1502: product of Nippon Zeon Co.
*5Akadama (red ball): product of Shiraishi Kogyo K.K.
*6Hakuenka CC: product of Shiraishi Kogyo K.K.

EXAMPLE 5

Example 1 was repeated as to Run No. 4, except that the tertiary butyl hypochlorite was replaced by tertiary butyl hypobromite. The results of measuring the friction factors and ozone resistance of the so treated rubber sheets are given in Table 5. Furthermore, the tertiary butyl hypochlorite treatment and omission of the treatment were repeated, the results of which are concurrently given in the same Table.

Table 5

| Run No. | 1 | 2 | 3 |
|---|---|---|---|
| Treating solution | Tertiary butyl hypobromite | Tertiary butyl hypochlorite | Untreated |
| Static friction factor | 0.50 | 0.58 | Immeasurable |
| Dynamic friction factor | 0.30 | 0.38 | do. |
| Static ozone resistance | A-2 | A-2 | C-4 |
| Dynamic ozone resistance | A-2 | A-2 | C-4 |

As shown in Table 5, favorable results were obtained also when tertiary butyl hypobromite was used.

EXAMPLE 6

One-hundred parts of acrylonitrile-butadiene copolymer rubber (Nipol 1042AL: product of Nippon Zeon Co.), 5 parts of zinc oxide, 1 part of stearic acid, 0.3 part of sulfur, 40 parts of HAF carbon, 3 parts of tetramethyl-thiuram disulfide and 1 part of cyclohexyl benzothiazyl sulfenamide were milled together with 8-inch rolls, and heated and pressed at 160°C. for 35 minutes. The sheets obtained were treated according to the treating method shown in Table 6 and dried. Then, the rubber sheets were elongated by 20%, and left standing in an ozone-containing atmosphere in a concentration of 100 ppHM, which was maintained at 35° ± 5°C. Thereafter their static ozone resistances were evaluated similarly to Example 1. The results are shown in Table 6.

Table 6

| Run No. | 1 | 2 (this invention) | 3 | 4 | 5 | 6 |
|---|---|---|---|---|---|---|
| Treating method | untreated | The sheet was immersed in a 25 volume % tertiary butyl hypochlorite solution in tertiary butyl alcohol for 30 seconds | The sheet was exposed in a chlorine gas for 10 minutes. | The sheet was exposed in a hydrogen chloride gas for 5 hours. | The sheet was immersed in water of 3% bromine for 1 minute. | The sheet was immersed in a mixed solution consisting of 100 ml water, 6 ml aqueous solution of sodium hypochlorite (6% effective chlorine), and 0.8 ml of 35% hydrochloric acid for 1 minute |
| Static ozone resistance Exposing time 1 hr. | C-1 | no crack | C-1 | C-1 | C-2 | C-1 |
| 2 | C-1 | no crack | C-1 | C-1 | C-3 | C-1 |
| 3 | C-2 | no crack | C-2 | C-2 | C-3 | C-2 |
| 4 | C-3 | A-3 | C-2 | C-2 | C-3 | C-2 |
| 7 | C-4 | A-3 | C-3 | C-3 | C-3 | C-3 |

As is clear from Table 6, the treating agent of this invention provides to the rubber sheet a superior ozone resistance to that of the conventional halogenation agent.

REFERENCE EXAMPLE

This Example proves that the treating agent used in this invention does not harm a metal and therefore is usable safely in factories.

The same treatment as in Runs Nos. 2–6 of Example 6 was performed on a stainless steel plate (SAE 1020) wherein the immersion time was changed to one minute in Run No. 2. Then, the stainless steel plate was left standing for a day, and the surface of the sample plate was observed. As a result it was found that corrosion occurred on the surface of the sample plate treated with the treating agent of Runs Nos. 3–6, but there was no corrosion on the surface of the sample plate treated with the treating agent of Run No. 2 (this invention).

EXAMPLE 7

100 Parts of acrylonitrile-butadiene copolymer rubber (Nipol 1042: product of Nippon Zeon Co.), 5 parts of zinc oxide, 1 part of stearic acid, 1.5 parts of sulfur, 40 parts of FEF carbon black, 1.5 parts of dibenzothiazyl disulfide, and 0.5 part of diphenyl guanidine were milled with 8-inch rolls and hot-pressed at 150°C for 30 minutes. The 2 mm sheets obtained were immersed in a 25 volume % tertiary butyl alcohol solution of tertiary butyl hypochlorite at normal temperature (about 25°C) for 30 minutes. Thereafter the sheets were washed first with methyl alcohol and then with water, and dried at room temperature.

The sheet obtained cut into a circular shape with a diameter of 63 mm. The amount (g) of a gasoline permeated through the cut sheet per $cm^2$ a day at 40°C was measured (the gasoline is an ASTM Fuel B, a mixture of isoctane and toluene with a volume ratio of 70 to 30). It was found to be $4.2 \times 10^{-3}$ g/day × $cm^2$. On the other hand, in the case of the untreated sheet, the amount was $13.5 \times 10^{-3}$ g/day × $cm^2$.

EXAMPLE 8

100 Parts of a blend consisting of acrylonitrile-butadiene copolymer rubber and polyvinyl chloride, a weight ratio being 70 to 30 (Nipol 1203J: product of Nippon Zeon Co.), 5 parts of zinc oxide, 1 part of stearic acid, 0.3 part of sulfur, 40 parts of FEF carbon black, 2.5 parts of tetramethylthiuram disulfide, and 2.0 parts of cyclohexylbenzothiazyl sulfenamide were milled with 8-inch rolls and hot pressed at 150°C for 30 minutes. The 2 mm sheets obtained were immersed in tertiary butyl alcohol solutions of tertiary butyl hypochlorite in the concentrations of 20 volume % (sample 1), 25 volume % (sample 2), and 30 volume % (sample 3) at normal temperature (about 25°C) for 30 minutes. The sheets were washed first with methyl alcohol and then with water, and dried at room temperature. The amount of gasoline permeated through the sheets so obtained was measured. The results are shown in Table 7.

Table 7

| | Amount of gasoline permeated ($10^{-3}$ g/day × $cm^2$) |
|---|---|
| Control (untreated) | 9.38 |
| Sample 1 | 3.53 |
| Sample 2 | 2.66 |
| Sample 3 | 2.43 |

The physical and chemical properties of the control and samples 1, 2, 3 were inspected. The results are shown in Table 8.

It is found from Table 8 that the other properties of the samples even treated according to this invention are not changed substantially.

Table 8

| | Control | Example 1 | Example 2 | Example 3 |
|---|---|---|---|---|
| Normal physical properties | | | | |
| Tensile strength (Kg/$cm^2$) | 180 | 168 | 178 | 165 |
| 100% modulus (Kg/$cm^2$) | 49 | 49 | 51 | 53 |
| 300% modulus (Kg/$cm^2$) | 140 | 138 | 142 | 140 |
| Hardness (JIS) | 77 | 77 | 76 | 78 |
| Tear strength (kg/cm) | 64 | 67 | 71 | 69 |
| Heat ageing test (Test tube 120°×70hrs) | | | | |
| Change ratio of tensile strength(%) | +8.3 | +14.9 | +5.6 | +12.7 |
| Change ratio of elongation (%) | −50.0 | −46.7 | −45.7 | −46.3 |
| Change ratio of 100% modulus (%) | +100.2 | +102.0 | −117.6 | +84.9 |
| Change of hardness | +4 | +6 | +7 | +5 |
| Oil resistance test (Ratio(%) of volume change caused by immesion) ASTM No. 3 oil (100°C × 70 hars.) | +12.6 | +9.9 | +9.0 | +5.9 |

CONTROL EXAMPLE

Example 8 was repeated with a treating agent shown in Table 9 instead of the treating agent of this invention used in Example 8. The results are shown in Table 9.

Table 9

| Treating agent | Amount of gasoline permeated ($10^{-3}$ g/day × $cm^2$) |
|---|---|
| Hypochlorous acid aqueous solution of 2% chlorine content | 7.11 |
| 2% aqueous solution of bromine | 6.20 |

Even the treating agent of the control shown in Table 9 is somewhat effective but inferior to that of the present invention.

EXAMPLE 9

100 Parts of a blend (Nipol 1203J: product of Nippon Zeon Co.) consisting of acrylonitrile-butadiene copolymer rubber and polyvinyl chloride, a weight ratio being 70 to 30, 5 parts of zinc oxide, 1 part of stearic acid, 0.3 part of sulfur, 40 parts of FEF carbon black, 2.5 parts of tetramethylthiuram disulfide, and 2.0 parts of cyclohexylbenzothiazyl sulfenamide were milled with 8-inch rolls, and hot-pressed at 150°C for 30 minutes.

The 2 mm sheets obtained were treated with a toluene solution of tertiary butyl hypochlorite at normal temperature (about 25°C) under conditions of concentrations and treating times shown in Table 10.

Table 10

| Sample No. | Concentration of tertiary butyl hypochlorite (volume %) | Treating time (second) |
|---|---|---|
| 1 | 5 | 30 |

Table 10-continued

| Sample No. | Concentration of tertiary butyl hypochlorite (volume %) | Treating time (second) |
|---|---|---|
| 2 | 15 | 30 |
| 3 | 25 | 30 |
| 4 | 25 | 30 |

The amount of gasoline permeated through sheets so treated and untreated sheets (control) was measured in the same manner as in Example 7. The results are shown in Table 11.

Table 11

| | Amount of gasoline permeated ($10^{-3}$ g/day × cm$^2$) |
|---|---|
| Control (untreated) | 22.4 |
| Sample 1 | 2.7 |
| Sample 2 | 0.6 |
| Sample 3 | 0.6 |
| Sample 4 | 0.7 |

EXAMPLE 10

Example 7 was repeated with a rubber containing carbon-to-carbon double bonds shown in Table 12 instead of the acrylonitrile-butadiene copolymer rubber used in Example 7. The results are shown in Table 12.

Table 12

| Rubber | Treatment | Amount of gasoline permeated ($10^{-3}$ g/day × cm$^2$) |
|---|---|---|
| Acrylonitrile-butadiene-isoprene ternary copolymer* | untreated | 14.2 |
| | treated | 4.7 |
| Acrylonitrile-isoprene copolymer** | untreated | 9.2 |
| | treated | 2.3 |

*Product of Nippon Zeon Co., Nipol DN-1201
**Product of Polymer Corp., Ltd., Polysar Krynac 833

EXAMPLE 11

100 Parts of styrene-butadiene rubber (Nipol 1502: product of Nippon Zeon Co.), 5 parts of zinc oxide, 1.8 parts of sulfur, 1.5 parts of stearic acid, 40 parts of HAF carbon black, 1.5 parts of dibenzothiazyl disulfide, and 0.7 part of diphenyl guanidine were milled with 6-inch rolls, and the blend obtained was pressed and vulcanized at 150°C for 20 minutes to prepare a shaped article of rubber having a thickness of 2 mm.

The surface of the shaped article was washed with acetone, immersed in a treating agent shown in Table 13 for 30 seconds, and left standing for a day. On the other hand, the surface of a steel SAE-1020 also was washed with methyl ethyl ketone.

Thereafter, an epoxy bonding agent (Sanyu resin A-460 produced by Sanyu Kogyo K.K.) was coated on the shaped article of rubber and steel. Both were bonded under pressure at 80°C and 100–200 g/cm$^2$ for an hour. The composite article obtained was subjected to the 180° peeling test according to JIS K-6301. The results are shown in Table 13.

Table 13

| Treating agent | Peel strength (kg/cm) |
|---|---|
| untreated | not bonded |
| 25 volume % tertiary butyl hypochlorite solution in tertiary butyl alcohol | 3.2 |

Table 13-continued

| Treating agent | Peel strength (kg/cm) |
|---|---|
| Tertiary butyl hypochlorite | 20.0 (rubber breakage) |

Superior bonding strength is obtained using tertiary butyl hypochlorite on the surface of the vulcanized rubber having a great chlorination capacity as a treating agent.

EXAMPLE 12

100 Parts of styrene-butadiene rubber (Nipol 1502: product of Nippon Zeon Co.), 5 parts of zinc oxide, 1.8 parts of sulfur, 1.5 parts of stearic acid, 40 parts of HAF carbon black, 1.5 parts of dibenzothiazyl disulfide, and 0.7 part of diphenyl guanidine were milled with 6-inch rolls, and the blend obtained was pressed and vulcanized at 150°C for 15 minutes to prepare a shaped article of rubber having a thickness of 2 mm. The shaped article was washed with acetone, immersed in a mixed solution of a 0.1 mol tertiary butyl hypochlorite and 90 g tertiary butyl alcohol at room temperature for 2 minutes, taken out, washed with water, and dried.

On the other hand, 100 parts of vinyl chloride resin (Zeon 131: product of Nippon Zeon Co.), 60 parts of dioctyl phthalate, 3 parts of stabilizer (S-67J: product of Katsuta Kako K.K.), and 40 parts of epoxy resin (Epikote: product of Shell International Chemicals Corp.) were milled with a mixer. The blend was further milled with 4 parts of diethylene triamine for 5 minutes and defoamed by a vacuum defoamation machine.

The sol obtained was coated on said shaped article of rubber and heated in a hot blast circulation-type oven at 180°C for 10 minutes. The bonding strength of the composite article obtained was measured. The results are shown in Table 14.

Table 14

| Treatment of shaped rubber article by tertiary butyl hypochlorite | untreated | treated |
|---|---|---|
| Bonding strength (kg/cm) | 2 | >5 |
| Breakage | surface breakage | Breakage of vinyl chloride resin sheet |

EXAMPLE 13

Example 11 was repeated using a rubber shown in Table 15 instead of the styrene-butadiene rubber used in Example 11. The results are shown in Table 15.

Table 15

| Treating agent | Rubber | Acrylonitrile* butadiene rubber | Polybutadiene** rubber |
|---|---|---|---|
| untreated | | not bonded | non bonded |

Table 15-continued

| Treating agent | Rubber Acrylonitrile* butadiene rubber | Polybutadiene** rubber |
|---|---|---|
| 25 volume % tertial butyl hypochlorite solution in tertiary butyl alcohol | 2.5 | 3.0 |
| tertiary butyl hypochlorite | 19.0 (rubber breakage) | 18.5 (rubber breakage) |

*Product of Nippon Zeon Co.: Nipol 1042AL
**Product of Nippon Zeon Co.: Nipol BR 1220

We claim:

1. A process for treating the surfaces of shaped articles of rubber, which comprises contacting the surfaces of shaped articles of rubber containing carbon-to-carbon unsaturated double bonds, with an alkyl hypohalite selected from one of the group consisting of $C_{1-5}$ alkyl hypohalites and halo- $C_{1-5}$ alkyl hypohalites.

2. The process of claim 1, in which the alkyl hypohalite is a tertiary alkyl hypohalite.

3. The process of claim 2, in which the alkyl hypohalite is tertiary butyl hypochlorite.

4. The process of claim 2, in which the alkyl hypohalite is tertiary butyl hypobromite.

5. The process of claim 1, in which the alkyl hypohalite is contacted with rubber articles in the form of an organic solvent solution in which the organic solvent is incapable of dissolving the surfaces.

6. A process for treating the surfaces of shaped articles of rubber, which comprises immersing the shaped articles of rubber containing carbon-to-carbon unsaturated double bonds, in an alkyl hypohalite selected from one of the group consisting of $C_{1-5}$ alkyl hypohalites and halo- $C_{1-5}$ alkyl hypohalites.

7. A process for treating the surfaces of shaped articles of rubber, which comprises immersing the shaped articles of rubber containing carbon-to-carbon unsaturated double bonds, in at least 0.5 volume % alkyl hypohalite which is selected from one of the group consisting of $C_{1-5}$ alkyl hypohalites and halo- $C_{1-5}$ alkyl hypohalites solution in an organic solvent in which the organic solvent is incapable of dissolving the surfaces at from 0°C. to the boiling point of the alkyl hypohalite for from 1 second to 10 hours.

8. A shaped article of rubber originally containing carbon-to-carbon unsaturated bonds the surface of which has been treated by the process of claim 1.

9. The process of claim 5, in which the alkyl hypohalite concentration in the solution is at least 25% by volume.

10. The process of claim 5, in which the organic solvent is tert-butyl alcohol, benzene, n-hexane, methyl ethyl ketone, or toluene.

11. The process of claim 7, in which the immersion is from 3 seconds to 60 minutes.

12. The process of claim 7, in which the alkyl hypohalite concentration in the solution is at least 25% by volume.

13. The process of claim 7, in which the organic solvent is tert-butyl alcohol, benzene, n-hexane, methyl ethyl ketone, or toluene.

14. The process of claim 7, in which the temperature is from 0°C. to 30°C.

* * * * *

UNITED STATES PATENT OFFICE
CERTIFICATE OF CORRECTION

Patent No. 3,940,548    Dated February 24, 1976

Inventor(s) Yoshihiro Todani, et al

It is certified that error appears in the above-identified patent and that said Letters Patent are hereby corrected as shown below:

Insert Foreign Application Priority Data to read as follows:

-- September 27, 1971    Japan................ 46-75221 --

Signed and Sealed this eighteenth Day of May 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,940,548
DATED : February 24, 1976
INVENTOR(S) : Yoshihiro Todani, et al It is certified that error appears in the above-identified patent and that said Letters Patent are hereby corrected as shown below:

Item 73, line 1, delete "Zlin", insert -- Zeon --

Signed and Sealed this

Twenty-fourth Day of August 1976

[SEAL]

Attest:

RUTH C. MASON
*Attesting Officer*

C. MARSHALL DANN
*Commissioner of Patents and Trademarks*